Figure 3:
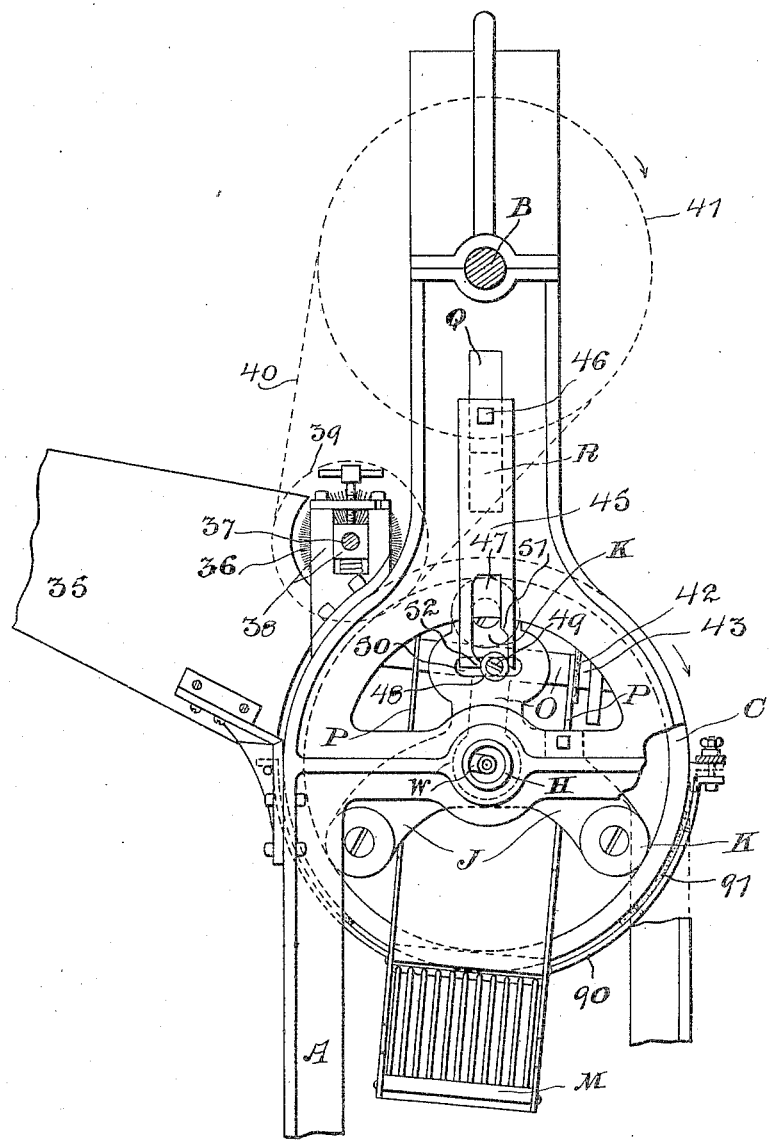

F. R. SMITH.
MACHINE FOR STEMMING CHERRIES.
APPLICATION FILED JAN. 13, 1913.
1,076,794.
Patented Oct. 28, 1913.
4 SHEETS—SHEET 1.
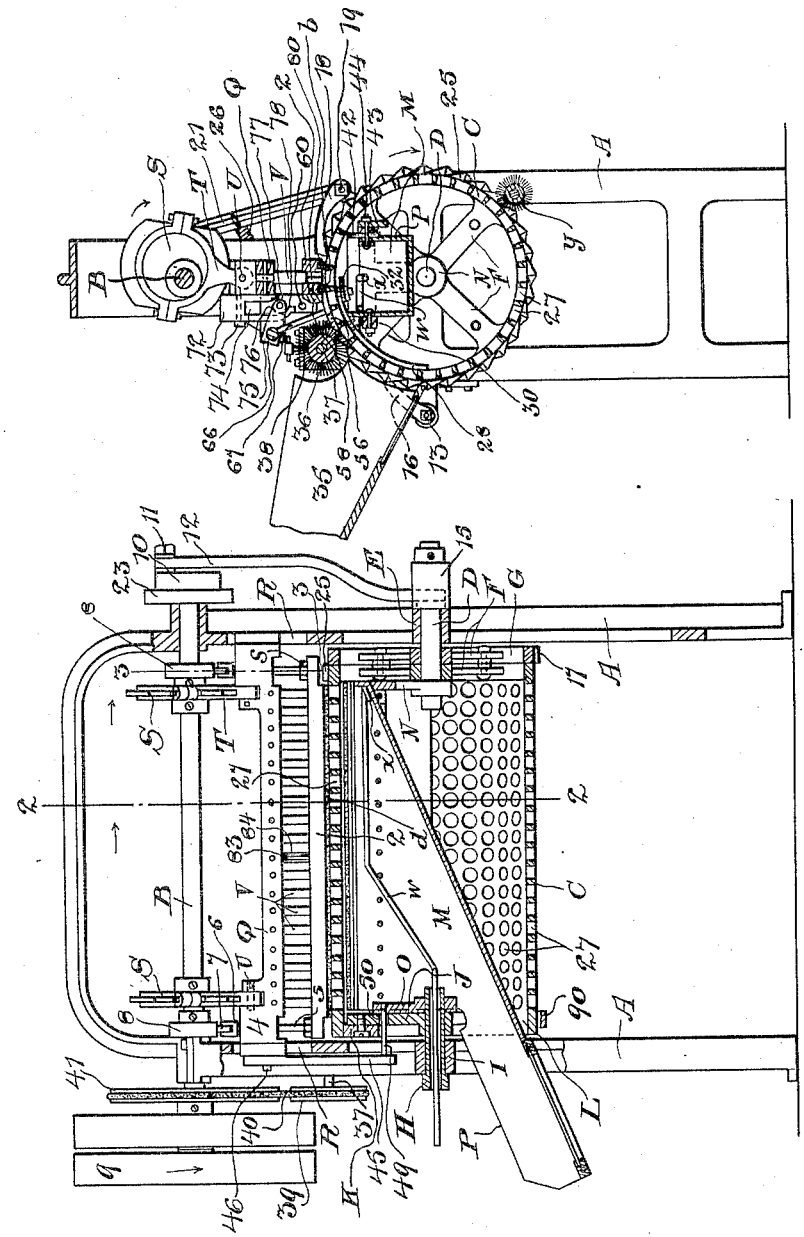

F. R. SMITH.
MACHINE FOR STEMMING CHERRIES.
APPLICATION FILED JAN. 13, 1913.

1,076,794.

Patented Oct. 28, 1913.
4 SHEETS—SHEET 2.

Witnesses.
Inventor.

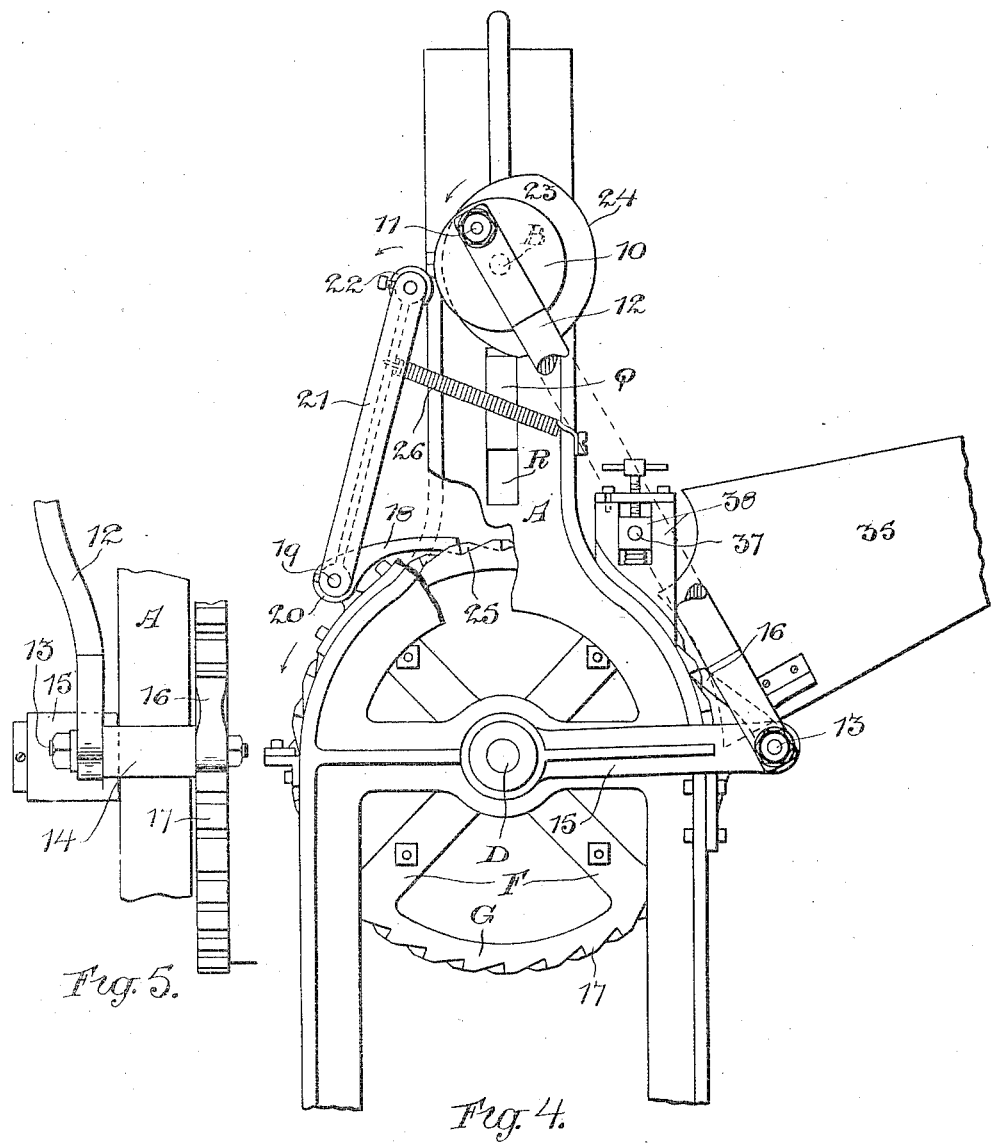

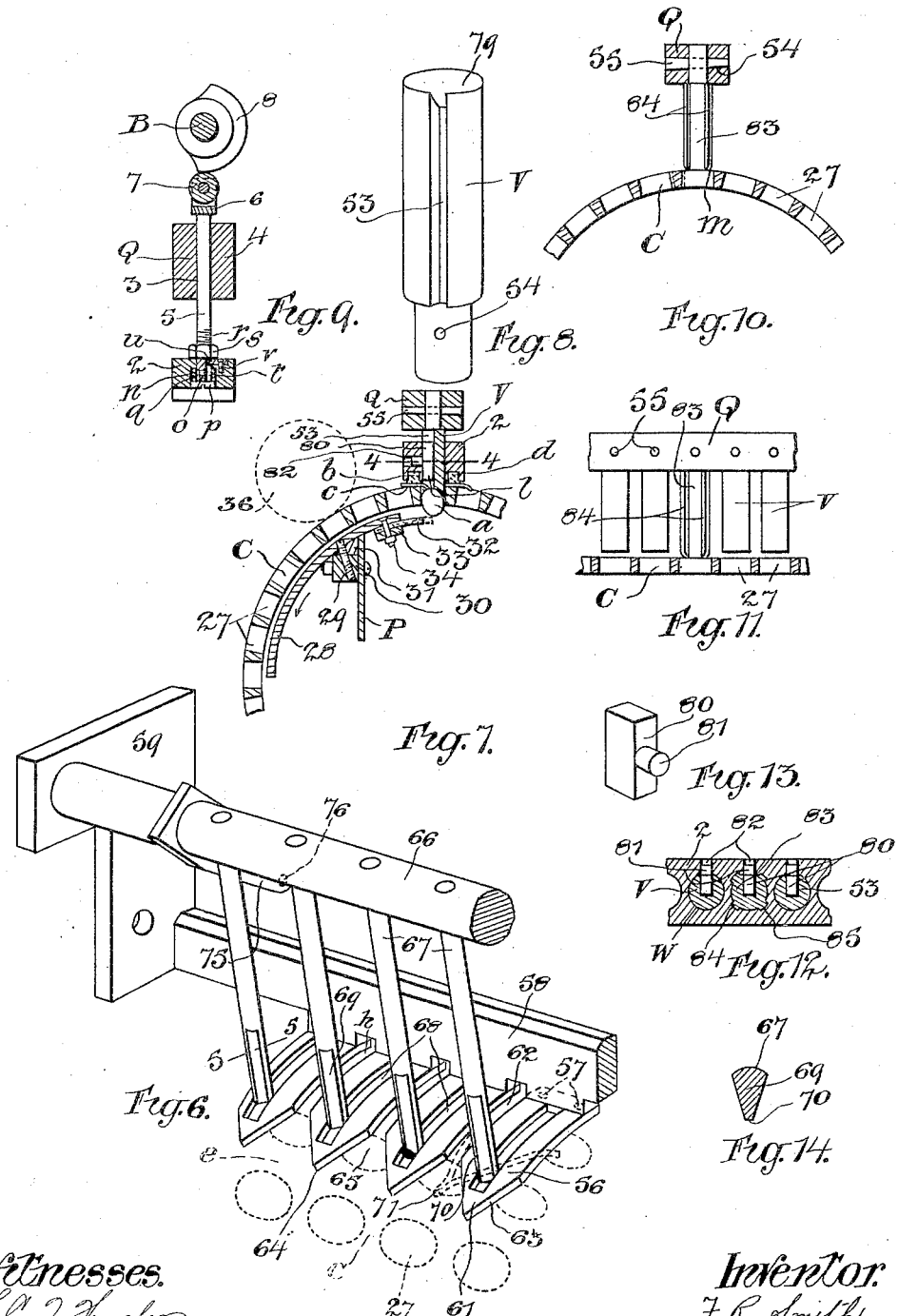

UNITED STATES PATENT OFFICE.

FRANK ROBBINS SMITH, OF TORONTO, ONTARIO, CANADA.

MACHINE FOR STEMMING CHERRIES.

1,076,794.　　　　　Specification of Letters Patent.　　Patented Oct. 28, 1913.

Application filed January 13, 1913. Serial No. 741,657.

*To all whom it may concern:*

Be it known that I, FRANK ROBBINS SMITH, a citizen of the United States of America, residing at the city of Toronto, in the county of York, Province of Ontario, Canada, have invented certain new and useful Improvements in Machines for Stemming Cherries, of which the following is a specification.

My invention relates to improvements in machines for stemming cherries, and the principal object of my invention is to design a machine of this class whereby a cherry is stemmed through a hole, by means operating therethrough, and in such a manner as to positively detach the cherry from its stem and without injuring the fruit.

Another object of my invention is to provide means to guide the cherry-stems so that they will be positioned properly so as not to be cut by the stemming elements.

A still further object of my invention is to provide automatic means for pulling apart the stems of cherries that are tied together so as to insure the successful operation of the machine.

A still further object of my invention is to design a particular type of plunger which performs the function of removing the cherry from its stem, so that the stem will not be cut during this operation.

A still further object of my invention is to combine with each plunger or stemming element, means to prevent the same from becoming clogged.

Further objects of my invention will be set forth in the following specification.

Broadly considered, the preferred form of invention comprises a rotary cylinder provided with a plurality of holes designed to receive the cherries; a plurality of plungers operating through said holes at certain times so as to detach the cherries from their stems; means for holding the stems of the cherries as the cherries are being separated from their stems; means for guiding the stems of the cherries so that the same will be ultimately positioned to insure the successful operation of the machine, and automatic means operating to rake apart or separate the tied stems of cherries, as hereinafter more particularly set forth.

In the following specification I shall describe what I consider to be the best embodiment of my invention, and I desire it to be understood that the principles can be embodied in different forms and I desire not to be limited beyond the requirements of the prior art and the terms of my claims.

Figure 1 is, in part, a vertical central longitudinal section through the cylinder of my machine and parts carried thereby, and a side elevation of the means for holding the cherry stems and removing the fruit therefrom and operating parts therefor. Fig. 2 is a vertical cross section on the line 2—2, Fig. 1. Figs. 3 and 4 are, respectively, elevations of the left-hand and right-hand ends of the machine illustrated in Fig. 1. Fig. 5 is a detail view showing the operating pawl for the cylinder, and its supporting parts. Fig. 6 is a perspective view of portion of the means for separating the tied stems of the cherries and positioning the same before the stemming-elements operate. Fig. 7 is a vertical cross section through portion of the cylinder and the shield mounted therewithin, and through one of the plungers and supporting part therefor and through means for holding the cherry stems, the position of the parts showing the action of one of the plungers in separating a cherry from its stem. Fig. 8 is a perspective view, from the underside, of one of the plungers for removing the cherries from their stems. Fig. 9 is a vertical cross section on the line 3—3, Fig. 1. Fig. 10 is a vertical cross section through portion of the cylinder showing the pilot plunger coacting therewith. Fig. 11 is a vertical longitudinal section through portion of the cylinder showing in side elevation a number of plungers operating through holes therein, and showing the relative length of the pilot plunger in respect of the other plungers. Fig. 12 is a horizontal longitudinal section on the line 4—4, Fig. 7, showing the plungers in the presser bar. Fig. 13 is a perspective view of one of the blocks mounted in the presser bar to prevent the preferred form of plungers from becoming clogged, and Fig. 14 is a horizontal cross section on the line 5—5, Fig. 6.

In the drawings, like characters of reference indicate corresponding parts in each figure.

Although I describe this machine for use in connection with unstemming cherries, still it will be understood that it may be also built to unstem such fruit as plums.

A are any suitable standards, in the upper ends of which has bearing the drive shaft B, C is the cylinder, which may be mounted in the frame of the machine after any suitable construction. In order that I may house a chute and certain other parts connected therewith, within the said cylinder, I prefer to use stub shafts as means for mounting the same in place. D is one stub shaft held in the bearing E, and loosely mounted on this shaft are spiders F which are suitably connected together and to the end G of the said cylinder.

H is a stub shaft which is mounted in the bearing I. Keyed to this shaft is a spider J in which are journaled a plurality of rollers K. These rollers rest against the end L of the cylinder C, and as this cylinder rotates this end of the same has bearing on the said rollers.

M is a suitable chute which is mounted within the cylinder C by any suitable means. My preferred means consists of a bracket N loosely mounted on the stub shaft D and suitably supporting the upper end of the said chute. O is a braket journaled on the stub shaft H. This bracket is suitably connected to the side walls P of the said chute, and by means of the same the lower portion of said chute is journaled on the stub shaft H.

Q is the plunger bar, the ends of which operate in vertical slots R formed in the standards A. S are a pair of eccentrics keyed to the shaft B, and through the medium of the strap members T and the pins U, the said plunger bar is connected to the said eccentrics. Mounted in the said plunger bar are a plurality of plungers V, and these plungers operate through holes W formed in the presser bar 2 which is positioned underneath the said plunger bar Q. The said presser bar 2 is designed to be depressed and elevated at certain times. I prefer to give these movements to the said presser bar by the following means: Operating through holes 3 formed in the ends 4 of the plunger bar Q are rods 5 in the brackets 6 of which are mounted rollers 7. By any suitable means, the preferred construction of which will be hereinafter particularly described, the lower ends of the said rods 5 are secured in the outer ends of the presser bar 2. 8 are cams keyed to the drive shaft B which coact with the roller 7 to depress the presser bar 2 at certain times. 9 is the drive pulley keyed to the shaft B, and keyed to this shaft is a member 10 to which is eccentrically connected by means of the pin 11 a connecting rod 12. This connecting rod is connected by the bolt 13 (held in the head 14 carried by the arm 15 loosely journaled on the stub shaft D) with the pawl 16 which is also mounted on said bolt 13. As the drive shaft B rotates, the pawl 16 is operated to coact with the ratchet 17 to turn the drum C one tooth at a time. In order to insure that the said cylinder will only be moved the distance mentioned, I provide a pawl 18 which is keyed to the rock shaft 19 journaled in the bracket 20 carried by one of the standards A. Keyed to the said rock shaft is an arm 21, in the upper end of which is journaled a roller 22. 23 is a cam keyed to the drive shaft B. In due course the face 24 of the cam 23 comes in contact with the roller 22, thereby moving the arm 21 in the direction indicated by arrow, and so lift the pawl 18 out of engagement with the ratchet 25. So soon as the pawl 16 has moved the cylinder C the desired distance, the face 24 of the cam 23 moves out of contact with the roller 22 thus permitting the spring 26 (which connects the arm 21 with the frame of the machine) to draw the arm 21 and the pawl 18 into the position illustrated in Fig. 4, when the said pawl will engage with one of the teeth of the ratchet 25 and so prevent further movement of the said cylinder. The said cylinder is provided with a plurality of holes 27, and as the plungers V operate through these holes in unstemming the cherries, it is most essential that the movements of the cylinder C be of a predetermined amount.

28 is a shield semi-circular in shape, and operating within the cylinder C and adjacent the side thereof which receives the fruit. This shield 28 is secured by any suitable means, as by brazing, to the bar 31 and by screws 29 to the bar 30 which is suitably secured to one of the walls P of the chute M.

32 is a strip of rubber of the desired stiffness which is clamped between the bar 33 and upper end of the shield 28, by any suitable means, such as bolts 34. The rubber strip 32 is really an extension of the shield 28, and it is used so as not to bruise the fruit.

The function of the shield 28 and the rubber strip 32 is to prevent the unstemmed cherries from passing through the holes 27. The unstemmed cherries pass from the hopper or chute 35 into the holes 27, and through the movement given the cylinder C, the cherries in one row of holes at a time are positioned underneath the plungers V.

Any suitable means, mounted in the mouth of the hopper or chute 35, may be employed to prevent the cherries from crowding against the presser bar, and to insure the cherries passing down into the holes 27. My preferred means for this purpose comprises a cylindrical-shaped brush 36 which is keyed to a shaft 37 journaled in suitable bearings 38. This shaft 37 is driven by a pulley 39 keyed thereto, which receives power by the belt 40 from the pulley 41 which is keyed to the shaft B.

The function of the shield 28 is to prevent the unstemmed cherries escaping through the holes 27 down on to the chute M. The function of the presser bar 2 is to hold the stems of the cherries when the plungers V are pushing the fruit therefrom.

Through the operation of the eccentrics S, the plunger bar Q is elevated, and when the ends 4 thereof come in contact with the brackets 6 of the rods 5, the presser bar is of course elevated, and it is held elevated until the cherry $a$ for example is positioned underneath one of the plungers V, when the cams 8 coact with the rollers 7 and depress the presser bar, thus clamping the foot $b$ thereof (which is preferably made of rubber) down upon the stem $c$ of this cherry. Immediately this operation is performed, the plunger is depressed and so removes the cherry $a$ from its stem. The unstemmed cherries drop on to the chute M and pass by gravity out of the machine. When the cherry $a$ occupies the position illustrated in Fig. 7 previous to the depression of the presser bar 2, the rubber strip 32 extends underneath the hole containing this cherry far enough to permit this cherry to rest thereon and prevent it from falling out of the hole: this position of the said rubber strip is shown by dotted lines. By means hereinafter particularly described, the chute M, is vibrated on the shafts H and D so as to move the shield 28 far enough in the direction indicated by arrow in Fig. 7, so as to move the rubber strip 32 out of the path of movement of the cherry $a$ after the foot $b$ has been pressed down upon the stem $c$ thereof. It will therefore be understood that there will be nothing in the path of movement of the cherry $a$ when the plunger unstemming the same is depressed. Immediately the cherry $a$ drops, the rubber strip 32 is brought back to normal position. Upon referring particularly to Fig. 6, it will be noticed that there is an imperforate longitudinal strip of the cylinder C between each row of holes 27, and this strip forms what I term the bed $e$ against which the stems of the cherries are held by the presser-bar 2. The presser foot 2 is also provided with a foot $d$, and the function of this foot $d$ is to hold the loose stems when the plungers are depressed to prevent them, as much as possible, from passing into the cylinder. From the foregoing part of the specification it will be understood that each time the cylinder C is moved, a bed $e$ will be positioned underneath the feet $b$ and $d$. The plungers V are withdrawn from the holes 27 before the presser bar 2 is raised so as to prevent, as much as possible, the loose stems from clogging the plungers.

42 is a strip of flexible material, such as rubber, which is suitably clamped between the bar 43 and one of the sides P of the chute, by bolts 44. This strip 42 projects above the side walls P and is provided to prevent the fruit which comes in contact therewith from being bruised. I shall now describe the preferred means for vibrating the chute M: 45 is a plate secured by any suitable means such as a bolt 46 to one end of the plunger bar Q. Formed in the lower end of this plate is a slot 47. 48 is a roller mounted on the pin 49 which is carried by the bracket O. The pin 49 extends through the slot 50 formed in one of the arms of the spider J. When the plate 45 occupies the position illustrated in Fig. 3, the plungers V occupy their highest position. After the presser bar 2 has been operated to clamp the cherry stems down upon one of the beds $e$, the shoulder 51 of the plate 45 comes in contact with the roller 48 and by means of the pin 49 moves the chute M on its bearing members, and so moves the shield 28 and strip 32 into the position shown in full lines in Fig. 7. After the cherries have been unstemmed and just before the plungers V reach the limit of their highest movement, the shoulder 52 of the plate 45 comes in contact with the roller 48 and through the parts already described moves the chute M to occupy the position shown in Fig. 3, thus moving the strip 32 into dotted position shown in Fig. 7. As the plate 45 is reciprocated, the movements described are given to the chute M and the parts supported thereby. These movements result in shaking the said chute back and forth somewhat violently so as to prevent the clogging of the stemmed cherries in the chute.

I have found from experiment that some means must be provided to guide the stems of the cherries into a certain position so that the same will not be severed by the plungers V. I have found that when a cylindrical shaped plunger operates through the holes 27, it is liable to cut the stem, unless the plungers be constructed to prevent this. My preferred construction of plungers consists in providing the same down one side thereof with a longitudinal groove 53. These longitudinal grooves open to the outer surface of the said plungers and are faced toward that side of the cylinder C which receive the unstemmed fruit. As each plunger is provided in its upper end with a hole 54 through which a key 55 passes, the said plungers are securely held in the plunger bar Q and locked so that the said grooves 53 will always occupy the position already described.

56 are a plurality of guiding plates which are secured by any suitable means, such as screws 57, to the underside of the supporting bar 58 which is positioned preferably close to one side of the presser bar 2, and above the cylinder C. This supporting-bar is connected at each end to plates 59 (one only of which is shown). These plates are positioned preferably against the inner sides of the standards A and are secured thereto by screws or other fastening means 60. The guiding plates 56 have pointed ends 61, as shown, and they are carried by the supporting bar 58 so as to leave a space 62 between each guiding plate. The said spaces 62 are positioned to be in alinement with the grooves 53 formed in the plungers V, when these plungers are depressed, and the holes 27 pass beneath the said spaces 62. When the cherries are passed into the holes 27 the stems thereof occupy various positions, but when they come in contact with the pointed ends 61 of the guiding plates 56 they are guided by the tapered sides 63 of the said pointed ends into the spaces 62. The result of the movements just described will insure the stems of the cherries being positioned so that the groove 53 of each plunger will pass down each side of the stem so that each plunger will have a clearance therewith. The point 64 of each pointed end 61 is positioned to be substantially midway between any two sets of holes, circumferentially considered, in the cylinder C. By providing the pointed ends 61, each space 62 is provided with a flared mouth 65 so positioned that the cherry stems can not fail to be guided into the spaces 62.

The guiding plates 56 are preferably curved as shown in Fig. 6 particularly, and they have a slight clearance with the cylinder C. Notches $h$ are formed in the underside of the supporting bar 58 opening into the spaces 62, so as to provide ample clearance for the stems with this bar.

Oftentimes I have found that the stems of two or more cherries are tied together, and to make my machine a thoroughly commercial one, I have found that some means should be preferably provided for separating the tied stems in order to prevent injury to the fruit and the clogging of the machine. My preferred means for performing this function comprises a rocking-bar 66 which is journaled at both ends in the plates 59. This rocking bar is provided with a plurality of fingers 67, the lower portions of which operate in longitudinal slots 68, formed in the guiding plates 56. The lower portion 69 of each finger 67 is shaped substantially as shown in Fig. 14 so as to provide a more or less sharpened edge 70 which will facilitate the work of the said fingers. By the preferred means hereinafter described, the fingers 67 are moved back and forth in respect of the supporting bar 58, and I prefer to time the outward movement of the said fingers to occur when the plungers V are in operation. At this moment, the extremity 71 of the tied stems shown in dotted lines in Fig. 6 will be quite near to the supporting bar 58 as will also be the lower portions of the fingers 67. When the said fingers are moved outward they of course will separate the tied stems, and the separated stems will be disposed of, as before described. My preferred means for operating the rocking bar 66, is as follows: 72 is a plate secured by any suitable means, such as screws 73, to the plunger bar Q. This plate is provided with a vertical slot 74. 75 is an arm keyed to the rocking-bar 66, and journaled in the outer end of this arm is a roller 76. In order to move the finger 67 away from the supporting bar 58, the shoulder 77 of the plate 72, as the plunger bar Q is moved downward, comes into contact with the roller 76 and moves the finger 67 into the position illustrated in Fig. 6. When the said plunger bar Q is elevated, in due course the shoulder 78 of the plate 72 contacts with the roller 76 thus moving the finger 67 into the position illustrated in Fig. 2, which is the position these fingers occupy while the cherry stems are being clamped by the presser-bar.

My preferred form of plungers are provided with cup-shaped ends 79 so as to more or less fit the cherry and so reduce to a minimum the bruising of the fruit. As is clearly illustrated in Fig. 8, the grooves 53 open into the ends 79. In order to keep the grooves 53 from becoming clogged up, I mount in the presser bar 2 a plurality of blocks 80, each of which is provided with a stem 81. These stems rest in holes 82 formed in the presser-bar 2. As will be seen upon referring particularly to Figs. 7 and 12, one of the blocks 80 rests in each of the grooves 53. It will be understood that since the plungers V have a greater range of movement than the presser bar 2, the ends of these plungers will be moved above the lower sides 1 of the said blocks, and therefore the said grooves will be freed of any material that may be passed thereinto from below.

In order to absolutely insure the constant alinement of the plungers V with the holes W in the presser-bar 2, I provide what I term a pilot-plunger 83. This plunger is somewhat longer than the other plungers, and the only difference in construction between the same and the other plungers is that this pilot plunger is provided with a plurality of ribs 84, preferably four in number, which operate in correspondingly shaped grooves 85 formed in the presser-bar 2. The coaction of the said pilot plunger with the said presser-bar will keep the said plungers in alinement with the holes W. The said pilot plunger, as already mentioned, is somewhat longer than the other plungers V, and the lower ends of the said ribs are rounded as shown at $m$. In case, through faulty construction, the holes 27 should be slightly out of alinement with the plungers V, the rounded ends $m$ of the said pilot plunger will engage with the edge of one of the holes 27 (see dotted lines in Fig. 10) and so shift the cylinder C far enough to place the holes thereof in alinement with the said plungers.

Since the said pilot plunger is longer than the other plungers, it will, when the machine is not alining the holes 27 with the plungers V, prevent the plungers V from being injured by contact with the said cylinder.

I prefer to mount the presser-bar 2 on the rods 5 so that the position of the same may be regulated on the rods 5 so as to adjust the pressure of the feet $b$ and $d$ down upon the beds $e$. It will be understood that if these feet be not held with sufficient force down upon the stems, the stems will pull through with the cherries. Now to prevent this, I may use any suitable construction to adjust the pressure of the said presser-bar, through the medium of the feet $b$ and $d$ against the cylinder C. My preferred construction consists in providing each end of the presser-bar with a chamber $n$ into which extends the lower end of the rods 5. Each lower end of the rods 5 is provided with a longitudinal threaded hole into which screws the threaded shank $o$ of the screw $p$. Surrounding the lower end of each rod 5 positioned in the said chambers $n$, and held in place by the heads of the screws $p$, is a coiled spring $q$. Screwing on the threaded portion $r$ of each rod 5 is an adjusting nut $s$. By loosening the nuts $s$, the springs $q$ will force the presser-bar 2 upward against these nuts and so lighten the pressure of the presser-bar upon the cherry stems. It will be clear to one skilled in this art that while the presser-bar must hold the cherry stems from slipping when the cherries are being removed therefrom, the pressure of this presser-bar must not be great enough to crush the said stems, otherwise there is danger of the stem being torn apart, and the part connected with the cherry passing through with the cherry on to the chute M.

In one side of the lower ends of the rods 5 is formed a longitudinal slot $t$, and extending into this slot is a plate $u$ which is secured to the presser bar 2 by any suitable means, such as a screw $v$.

The construction just described permits the adjustment of the presser-bar on the rods 5, and at the same time keeps the rollers 7 in alinement with the cams 8.

As a certain amount of the detached stems pass into the chute M, in order to prevent the same from accumulating sufficiently within the said chute to cause the jamming of the cherries therein, I prefer to use a water pipe $w$ positioned as shown in the said chute with the discharge end $x$ thereof at the upper end of the chute. When I use this water pipe, I will pass the same through the stub shaft H, which will then be constructed hollow as illustrated.

Any suitable means, such as a rotary brush $y$ may be used to clean the surface of the cylinder C from loose stems and so relieve the brush 36 of more or less work.

Upon referring to Fig. 7 it will be noticed that the screw 29 is provided with a right-hand and left-hand thread. The corresponding screw at the right-hand end of the shield in Fig. 1 is similarly threaded. By manipulating these screws in the same direction, the position of the shield 28 and strip 32 in respect of the inner side of the cylinder C can be regulated. The portion of the screw 29 as shown in Fig. 7 which operates through the bar 31, is provided with a left-hand thread so that as this screw is turned in either direction, the position of the end of the shield 28 held thereby will be adjusted in respect of the cylinder C.

90 is a band friction-brake which is provided with shoes 91 which coact with the end L of the cylinder C to prevent the overthrow of this cylinder when moved by the pawl 16. This brake may be mounted in position after any suitable manner, and the construction illustrated in Fig. 3 may be employed for this purpose. Since the construction mounting this brake in place does not form a part of my invention, further description thereof is unnecessary.

What I claim as my invention is:

1. In a machine of the class described, the combination with a member provided with a plurality of holes passing therethrough, each hole designed to receive a cherry at a time, of means coacting with said member to hold the stems of the cherries while the cherries are being separated therefrom; means for reciprocating said means in respect of said member; a plurality of members, each reciprocating through its associated one of said holes to unstem the cherries while the stems thereof are held by said holding means, and means for reciprocating said last-mentioned members.

2. In a machine of the class described, the combination with a member provided with a plurality of holes passing therethrough, each hole designed to receive a cherry at a time, of a plurality of members, each reciprocating through its associated one of said holes whereby the cherry therein while being pushed therethrough is separated from its stem; means for holding the stems of the cherries during unstemming, and means for operating said members and said stem-holding means.

3. In a machine of the class described, the combination with a member provided with a plurality of holes passing therethrough, each hole designed to receive a cherry at a time, of means coacting with said member to hold the stems of the cherries while the cherries are being separated therefrom; means for reciprocating said means in respect of said member; a plurality of plungers, each operating through its associated one of said holes to unstem the cherries while the stems thereof are being held by said holding-means, and each provided in its outer side with a longitudinal groove which opens through to the lower end thereof; means in which said plungers are mounted so that the grooves thereof will face toward the unstemmed fruit placed in the machine; means for reciprocating said plungers; means positioned in advance of said stem-holding means for the purpose of positioning the stems of the cherries so that their inner portions thereof will be in the path of movement of said grooves when said plungers descend, and means for separating any of the stems that may be tied.

4. In a machine of the class described, the combination with a rotary cylinder provided with a plurality of holes passing therethrough and alined both longitudinally and circumferentially in parallel rows; a frame in which said cylinder is mounted, and means for moving said cylinder at given intervals predetermined distances, of means coacting with said cylinder to hold the stems of the cherries positioned in the said holes while the said cherries are being separated therefrom; means for reciprocating said means in respect of said cylinder; a plurality of members, each operating through its associated one of said holes to unstem the cherries while the stems thereof are being held by said holding means, and means for reciprocating said last-mentioned members.

5. In a machine of the class described, the combination with a rotary cylinder provided with a plurality of holes passing therethrough and alined both longitudinally and circumferentially in parallel rows; a frame in which said cylinder is mounted, and means for moving said cylinder at given intervals predetermined distances, of means coacting with said cylinder to hold the stems of the cherries positioned in the said holes while the said cherries are being separated therefrom; means for reciprocating said means in respect of said cylinder; a plurality of members, each operating through its associated one of said holes to unstem the cherries while the stems thereof are being held by said holding means; means for reciprocating said last-mentioned members; a member positioned within said cylinder and operating to prevent the unstemmed cherries from passing through the holes they occupy, and means for shifting said member so that it will be moved out of the path of movement of the cherries that are being separated from their stems.

6. In a machine of the class described, the combination with a rotary cylinder provided with a plurality of holes passing therethrough and alined both longitudinally and circumferentially in parallel rows; a frame in which said cylinder is mounted, and means for moving said cylinder at given intervals predetermined distances, of means coacting with said cylinder to hold the stems of the cherries positioned in the said holes while the said cherries are being separated therefrom; means for reciprocating said means in respect of said cylinder; a plurality of members, each operating through its associated one of said holes to unstem the cherries while the stems thereof are being held by said holding means; means for reciprocating said last-mentioned members; a member positioned within said cylinder and operating to prevent the unstemmed cherries from passing through the holes they occupy; means for shifting said member so that it will be moved out of the path of movement of the cherries that are being separated from their stems, and a chute mounted within said cylinder and connected to said last-mentioned member and moving therewith.

7. In a machine of the class described, the combination with a rotary cylinder provided with a plurality of holes passing therethrough and alined both longitudinally and circumferentially in parallel rows; means for moving said cylinder at given intervals predetermined distances, of a presser bar longitudinally provided with a plurality of alined holes; a plunger bar positioned above said presser bar; a plurality of plungers carried by said presser bar and extending therebelow, each of the said plungers operating in its associated hole formed in said presser bar; means for reciprocating said plunger bar; means whereby said presser bar is reciprocated; a resilient foot carried by said presser bar and extending therebelow and designed to press down upon said cylinder to hold the stems of the cherries while the cherries are being removed therefrom by said plungers; a member positioned within said cylinder and operating to prevent the unstemmed cherries from passing through the holes they occupy; and means for shifting said member so that it will be moved out of the path of movement of the cherries that are being separated from their stems.

8. In a machine of the class described, the combination with a member provided with a plurality of holes passing therethrough, each hole designed to receive a cherry at a time, of means coacting with said member to hold the stems of the cherries while the cherries are being separated therefrom; means for reciprocating said means in respect of said member; a plurality of plungers, each operating through its associated one of said holes to unstem the cherries while the stems thereof are being held by said holding-means, and each provided in its outer side with a longitudinal groove which opens through to the lower end thereof; means in which said plungers are mounted so that the grooves thereof will face toward the unstemmed fruit placed in the machine; means for reciprocating said plungers; a plurality of guiding plates positioned in advance of said stem-holding means, each spaced apart and provided with pointed ends; a supporting bar to which said guiding plates are secured, and means operating in advance of said stem-holding means for the purpose of separating any of the stems that may be tied.

9. In a machine of the class described, the combination with a member provided with a plurality of holes passing therethrough, each hole designed to receive a cherry at a time, of means coacting with said member to hold the stems of the cherries while the cherries are being separated therefrom; means for reciprocating said means in respect of said member; a plurality of plungers, each operating through its associated one of said holes to unstem the cherries while the stems thereof are being held by said holding-means, and each provided in its outer side with a longitudinal groove which opens through to the lower end thereof; means in which said plungers are mounted so that the grooves thereof will face toward the unstemmed fruit placed in the machine; means for reciprocating said plungers; a plurality of guiding plates positioned in advance of said stem-holding means, each spaced apart, and each provided with a pointed end and a longitudinal slot; a supporting-bar to which said guiding-plates are secured; a rocking-bar; a plurality of fingers carried by said rocking bar, and depending therebelow, the lower ends of said fingers operating in the slots formed in said guiding-plates, and means for actuating said rocking-bar in order to cause the said fingers to separate the tied stems.

10. In a machine of the class described, the combination with a member provided with a plurality of holes passing therethrough, each hole designed to receive a cherry at a time, of means coacting with said member to hold the stems of the cherries while the cherries are being separated therefrom; means for reciprocating said means in respect of said member; a plurality of plungers each operating through its associated one of said holes, and each being provided in its outer side with a longitudinal groove which opens through to the lower end thereof, the said lower end of each plunger being concaved; means for reciprocating said plungers, and means mounted in each of the grooves of the said plungers to prevent the same from clogging up.

11. In a machine of the class described, the combination with a member provided with a plurality of holes passing therethrough, each hole designed to receive a cherry at a time, of reciprocating means coacting with said member whereby a cherry at a time is detached from its stem while being pushed through its associated hole by said reciprocating means; means for operating said reciprocating means, and means for separating any of the stems that may be tied.

12. In a machine of the class described, the combination with a rotary cylinder provided with a plurality of holes passing therethrough and alined both longitudinally and circumferentially in parallel rows; a frame in which said cylinder is mounted; means for moving said cylinder at given intervals predetermined distances; means coacting with said cylinder to hold the stems of the cherries positioned within the said holes while the said cherries are being separated therefrom; means for operating said stem-holding means; a plurality of plungers, each operating through its associated one of said holes to unstem the cherries while the stems thereof are being held, and means for reciprocating said plungers, of a plurality of guiding plates, spaced apart, and each carried by a member carried by said frame, in advance of said stem-holding means, and means coacting with said guiding plates to separate any of the stems that may be tied.

13. In a machine of the class described, the combination with a presser bar provided with a row of alined holes; a plunger bar positioned above said presser bar; a plurality of plungers carried by said plunger bar and extending therebelow and operating through said holes; a pilot plunger, longer than the other plungers, carried by said plunger bar and substantially midway the ends thereof, the same being provided with a plurality of longitudinal ribs which operate in vertical grooves formed in the sides of the hole in said presser-bar through which said pilot plunger operates, the edges of the lower end of said pilot plunger being rounded; a suitable frame for supporting the before-mentioned elements, and means for operating said presser foot and said plunger bar.

14. As a new article of manufacture, a cherry stemming plunger cylindrical in shape and provided in one side with a longitudinal groove which opens to the outer surface thereof and through to the lower end thereof, the said lower end being concaved.

FRANK ROBBINS SMITH.

Witnesses:
S. C. I. THACHER,
R. STROHMAYR.